United States Patent [19]

Amelio et al.

[11] 3,896,474

[45] July 22, 1975

[54] CHARGE COUPLED AREA IMAGING DEVICE WITH COLUMN ANTI-BLOOMING CONTROL

[75] Inventors: Gilbert F. Amelio, Saratoga; Rudolph H. Dyck, Palo Alto, both of Calif.

[73] Assignee: Fairchild Camera and Instrument Corporation, Mountain View, Calif.

[22] Filed: Sept. 10, 1973

[21] Appl. No.: 395,663

[52] U.S. Cl. .................. 357/24; 178/7.1; 250/211 J; 307/311; 357/30

[51] Int. Cl.$^2$ .......................................... H01L 27/14

[58] Field of Search .... 357/24, 30; 307/304, 221 D; 317/235 N, 235 G; 250/211 J, 578; 178/7.1

[56] References Cited

UNITED STATES PATENTS

| | | | |
|---|---|---|---|
| 3,728,590 | 4/1973 | Kim et al. | 307/304 |
| 3,771,149 | 11/1973 | Collins et al. | 307/304 |
| 3,789,267 | 1/1974 | Krambeck et al. | 307/304 |
| 3,792,322 | 2/1974 | Boyle et al. | 307/304 |

OTHER PUBLICATIONS

Sequin, "Blooming Suppression in CCAIDs," *Bell System Technical Journal,* Oct. 1972, pp. 1923–1926.

Amelio, "Physics and Applications of CCDs," IEEE International Convention, 1973, paper No. 1/3, pub. in Vol. 6 Tech. Papers, Mar. 26, 1973.

*Primary Examiner*—William D. Larkins
*Attorney, Agent, or Firm*—J. Ronald Richbourg; Alan H. MacPherson

[57] ABSTRACT

A charge coupled area imaging device comprises columns of light sensing elements for accumulating charge packets in response to incident light, and parallel shift registers for shifting the charge packets to an output register. An anti-blooming diode is disposed in cooperating relationship with each of the shift registers to sink excess charges from the shift register, and thereby prevents the excess charges from spreading into the output register or other areas of the device where excess charges are undesirable.

10 Claims, 6 Drawing Figures

CHARGE COUPLED AREA IMAGING DEVICE WITH COLUMN ANTI-BLOOMING CONTROL

BACKGROUND OF THE INVENTION

1. Field of the Invention

This invention relates to charge coupled area imaging devices and in particular to an array of columns of light sensing elements having parallel disposed shift registers combined with an outut shift register, wherein the latter is prevented from saturation by allowing excess charges to be removed by a sink diode before saturation; and the method of operating such devices.

2. Description of the Prior Art

W. S. Boyle and G. E. Smith describe the basic concept of charge coupled semiconductor devices (hereinafter referred to as "CCD") in an article published in the Apr., 1970 Bell System Technical Journal, page 587, entitled "Charge Coupled Semiconductor Devices." As discussed by Boyle and Smith, CCD's are potentially useful as shift registers, delay lines, and in two dimensions, as imaging or display devices.

In Patent Application Ser. No. 343,759 filed on Mar. 22, 1973 by Choong-Ki Kim and Rudolph H. Dyck, for "A Buried Channel, Charge Coupled Linear Device," and assigned to the assignee of this invention, a linear imaging array is described where, in one embodiment, charge is accumulated in a line of light sensing elements and then transported to two transport arrays adjacent to the imaging array by controlling the potential on transfer gates between the light sensing elements and the transport arrays.

As disclosed in copending patent applications Ser. No. 362,131 filed on May 21, 1973 by Gilbert F. Amelio for "Charge Coupled Device With Exposure and Anti-blooming Control," and assigned to the assignee of this invention, charge packets accumulate in the substrate of a CCD imaging array (either linear or area) in response to light incident on the substrate, and are stored in potential wells near the surface of the array. The semiconductor material in which one packet of charge is accumulated response to incident light, together with the overlying insulation and conductor, is called a "photo sensor" or alternatively, a "light sensing element." The accumulated packet of charge comprises carriers which are minority in relation to the conductivity type of the predominant impurity in the substrate containing the potential wells. The potential wells are localized beneath an optically transparent conductor and each well is bounded on two of its four sides by so-called channel stop diffusions, on the other two sides parallel to the surface by a gated CCD analog shift register and by a third channel stop diffusion, on its top by insulation and on its bottom by semiconductor material. In the axis perpendicular to the semiconductor surface, the potential well comprises parabolic potential profiles formed by the field lines terminating on the donors and acceptors in the implanted layer for buried channel structures (or surface region of the semiconductor material when a buried channel is not used) and the semiconductor, respectively. When this three-dimensional well becomes saturated with charge, charge carriers spread away from the desired assembly point in the light sensing element and "blooming" occurs. "Blooming" is defined as the spreading of the charge originally accumulated in a light sensing element in such a way as to interact with charge accumulated in adjacent light sensing elements.

As disclosed in the above-cited application Ser. No. 362,131, a charge sink region associated with each light sensing elements in the array is disposed within the CCD substrate to prevent "blooming" from seriously degrading the detected image. This anti-blooming structure disclosed by Amelio requires a large amount of space on the surface of CCD imaging arrays because one sink region is required for each light sensing element. This structure reduces the resolution of the image detected by the array.

SUMMARY OF THE INVENTION

In accordance with this invention, a CCD area array uses only a single sink region per column of light sensing elements. Therefore a considerable amount of space is saved in the construction of a charge coupled area imaging device over the space used to construct a prior art device using one sink region per light sensing element. Reducing the number of sink regions makes possible either higher resolution of the image or a smaller array. Although any given column of light sensing elements may "bloom" in the structure of this invention, such "blooming" is limited to the column containing the light sensing element which saturates and cannot spread to other columns or to the output register.

In accordance with an embodiment of this invention, a plurality of columns (or lines) of light sensing elements are disposed in a two-dimensional array for receiving light and accumulating charge packets in response thereto. Shift registers are disposed parallel and adjacent to the columns (or lines) of light sensing elements to receive the charge packets accumulated in the elements, and to transfer these charge packets to an output register and to external circuitry. A single charge sink region, disposed in the vicinity of each shift register adjacent to the output register for receiving excess charge accumulated as a result of saturation, precludes charge overflow into the output register.

This structure prevents column blooming from affecting the output register, uses a minimum number of charge sink diodes, and enables construction of a high resolution charge coupled area imaging device.

DETAILED DESCRIPTION

Figures 1, 2C:
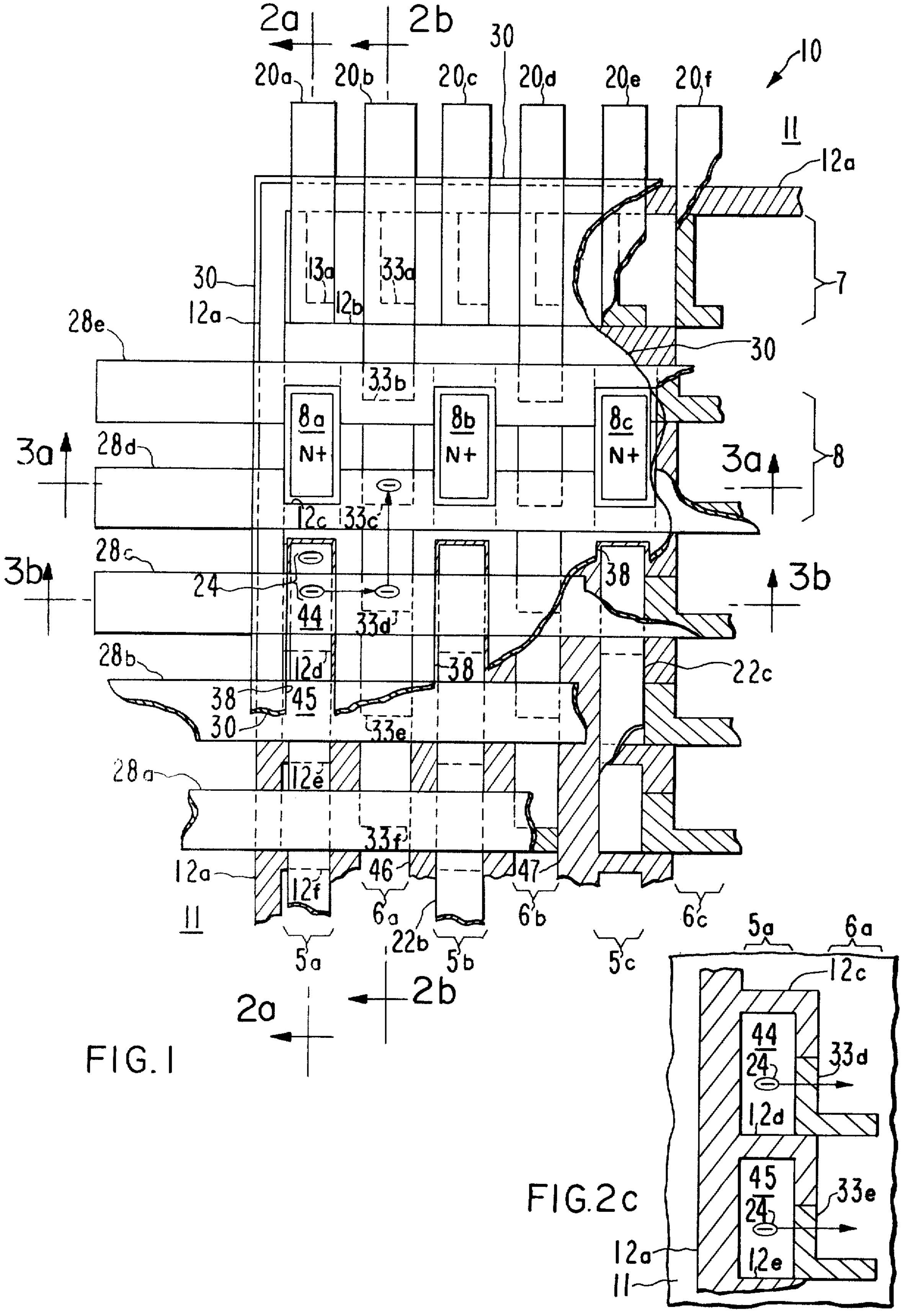
FIG. 1 shows a plan view of a portion of a two-dimensional array of light sensing elements constructed in accordance with this invention.
FIG. 2*c* illustrates a detail plan view of two light sensing elements.

With reference to FIG. 1, a portion of a charge coupled area imaging device 10 is shown in plan view. The drawings used to illustrate this invention are not drawn to scale, and illustrate the principles of the invention by depicting only a small portion of the device 10. While one embodiment will be described as using silicon semiconductor material, this invention can be implemented with any semiconductor material in which a charge coupled device can be formed.

The device 10 is formed on a substrate 11 of semiconductor material, which is typically silicon. A plurality of columns, such as columns 5*a*, 5*b*, 5*c* . . . , of light sensing elements are disposed in association with a first portion of the substrate 11 for a accumulating packets of charge in response to incident light impinging upon individual light sensing elements within the columns. A multiplicity of shift registers, such as registers 6*a*, 6*b*, 6*c* . . . , are disposed in association with a second portion of the substrate 11; and the registers are arranged parallel to the columns 5*a*, 5*b*, 5*c* . . . , respectiviely. In accordance with one embodiment of this invention, registers 6*a*, 6*b*, 6*c* . . . , correspond on a one-to-one basis to the columns of light sensing elements. Registers 6*a*, 6*b*, 6*c* . . . receive the charge packets accumulated in the light sensing elements of corresponding columns 5*a*, 5*b*, 5*c* c . . . , and are used to transfer the charge packets to an output shift register 7 disposed in association with a third portion of the substrate 11. The output shift register 7 transfers the charge packets received from the respective registers 6*a*, 6*b*, 6*c* . . . to external charge detection circuitry (not shown).

A plurality of charge sink regions 8 are disposed in cooperating relationship with the shift registers 6*a*, 6*b*, 6*c* . . . for receiving excess charges spreading along the shift registers as a result of the saturation of any light sensing element contained within the columns 5*a*, 5*b*, 5*c* . . . . For example, when excess charges are accumulated in any of the light sensing elements within column 5*a*, these charges flow into the shift register 6*a*; and, as a result of a biasing potential applied to the portion of substrate 11 between shift register 6*a* and charge sink region 8*a*, the excess charges will transfer to region 8*a* instead of into regiser 7. Only one charge sink, such as region 8*a*, is required for each column of light sensing elements, such as column 5*a*; whereas in the above-cited patent application Ser. No. 362,131 a charge sink region is required of each light sensing element. While only three parallel disposed shift registers with three related charge sink regions and three columns of light sensing elements are shown in FIG. 1, the structure as disclosed herein can contain as many columns of light sensing elements with as many elements in each column as required by the design limitations inherent in the manufacture of the device 10.

Figure 2A:
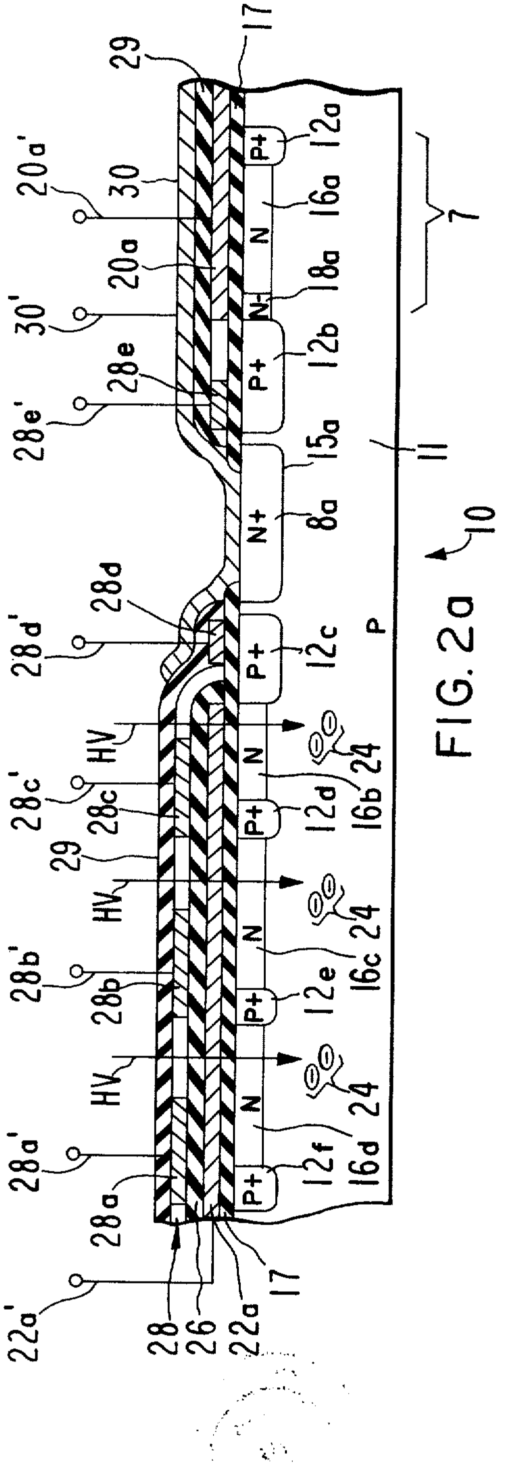
FIG. 2*a* is an elevational cross-section of the array taken along a single column of light sensing elements.

Referring now to FIG. 2*a*, an elevational cross-section is illustrated along column 5*a*, wherein light sensing elements are shown in the left-hand portion of the figure, and a portion of the output shift register 7 is shown in the right-hand portion of the figure with the charge sink region 8*a* shown therebetween. Channel stop regions 12*a* through 12*f* are formed in the top surface of the substrate 11, wherein regions 12*c* through 12*f* demarcate a portion of the light sensing elements of column 5*a*. Substrate 11 is shown of P-type conductivity and thus the channel stop regions are likewise of a P-type conductivity, but with a higher concentration of P-type impurities than substrate 11. Therefore, the channel stop regions are designated herein by the symbol P+.

Charge sink region 8*a* is formed in the semiconductor material by implanting or diffusing within substrate 11 a high conductivity N type material, such as phosphorous. The structure and purpose of the region 8*a* is similar to that of region 15 as disclosed in the above-cited application Ser. No. 362,131. Region 8*a* forms a charge sink, which is a reverse-biased diode comprising region 8*a* of N+ conductivity separated from the P-type material of substrate 11 by a PN junction 15*a*.

To improve the performance of the device of the present invention, a buried channel may be employed. A buried channel is obtained typically by placing appropriate impurities (n type impurities for an n channel device, and p type impurities for a p channel device) in the semiconductor near the semiconductor-insulator interface. Typically this layer is formed by using ion implantation techniques. In FIG. 2*a*, such an n layer forms regions 16*a* through 16*d* near the surface of the substrate 11.

Implanted barrier 18*a*, which is a part of the output shift register 7, is formed on the right-hand side of channel stop region 12*b* by implanting a lower donor density per unit area than is used in regions 16*a* through 16*d*. Barrier 18*a* is designated herein as having a concentration represented by the symbol n-. The method of forming implanted barriers, such as barrier 18*a*, is disclosed in copendng patent application Ser. No. 362,132, filed May 21, 1973 by Gilbert F. Amelio et al, for "Self-Aligned Implanted Barrier for Two-Phase Charge Coupled Devices."

An insulator material 17, such as silicon dioxide when a silicon substrate is employed, is formed over the top surface of substrate 11. Overlying the left-hand portion of substrate 11 is a transparent conductor 22*a*, with an associated electrical contact 22*a'*. Conductor 22*a*, which functions as a photogate conductor for controlling the CCD channel potential of the light sensing elements, typically comprises a portion of a layer 22 of transparent material such as selectively-doped polycrystalline silicon. The method of forming a plurality of transparent conductors, such as conductors 22*a*, 22*b*, 22*c* . . . (FIG. 1), from a single layer of doped polycrystalline silicon is disclosed in U.S. Pat. No. 3,728,590 issued to Choong-Ki Kim and Edward H. Snow on Apr. 17, 1973 and assigned to the assignee of this invention. Conductor 22*a* can also comprise a conductive, transparent metal film. The structure and operation of a typical photogate, similar to conductor 22*a*, is disclosed in copending application Ser. No. 357,760 filed May 7, 1973 by Gilbert F. Amelio, for "Transfer GateLess Photosensor Configuration," and assigned to the assignee of this invention.

A potential is applied to conductor 22*a* via lead 22*a'* to form a depletion region (not shown) in the underlying substrate 11. Incident light then passes through conductor 22*a*, as shown by arrows hv (wherein hv represents a flux of photons) directed into the substrate in and near where electrons 24 accumulate in response to the light. The electrons 24 accumulate in the depletion region in an amount proportional to the integral of the light incident on the particular region underlying conductor 22*a*. Electrons 24 thus represent the intensity of the incident light, and together constitute one of the charge packets referred to herein.

Electrons 24 will remain in the n type regions 16*b*, 16*c* and 16*d*, as a result of the channel stops 12*c*, 12*d*, 12*e* and 12*f* demarcating the sides (not shown) of the potential wells. However, the electrons 24 can move in a direction perpendicular to and out of the plane of FIG. 1*a* in response to control signals, as will be described in greater detail below.

Additional insulation 26 is formed over layer 22 and must be transparent to the desired incident radiation. A layer 28 of selectively-doped polycrystalline silicon is formed over insulation 26 on the left-hand portion of the substrate 11, and over the insulation 17 on the right-hand side of the substrate. Portions of polycrystalline silicon layer 28 are doped to form conductors 20*a* and 28*a* through 28*e* as disclosed in the above-cited U.S. Pat. No. 3,728,590. Therefore, conductors 20*a* and 28*a* through 28*e* are transparent to incident light. Voltages are applied to conductors 20*a* and 28*a* through 28*e* by means of leads 20*a'* and 28*e'*, respectively.

Conductor 20*a* (FIGS. 1 and 2*a*) comprises a portion of one conductor of the output shift register 7. Conductors 28 are part of the gate structure of the parallel disposed shift registers 6*a*, 6*b*, 6*c* . . . which are used to transfer the charge packets accumulated beneath conductor 22*a* to the output shift register 7. Conductors 28 comprise the conductors for all the parallel disposed shift registers of the device 10, and therefore the cross sections of these conductors in FIG. 2*a* only illustrate interconnections between the shift registers, and have no effect on the accumulation of electrons within the light sensing elements.

Insulation layer 29 is formed over the structure on the substrate 11, except in the area above charge sink region 8*a*. Insulation 29 is typically, though not necessarily, an oxide of silicon such as silicon dioxide. An opaque light shield 30 (typically, though not necessarily, aluminum) is formed over select portions of insulation 29. Shield 30 prevents the impingement of incident light upon portions of substrate 11 where charge accumulation is undesired, such as all areas of the device except the columns of light sensing elements. In accordance with one embodiment of this invention, shield 30 makes ohmic contact with region 8*a*; and a potential may be applied to shield 30 viq lead 30' for biasing the region 8*a*. However, a separate lead can be used for biasing the region 8*a*, wherein shield 30 does not make ohmic contact with the charge sink regions 8.

Figure 2B:
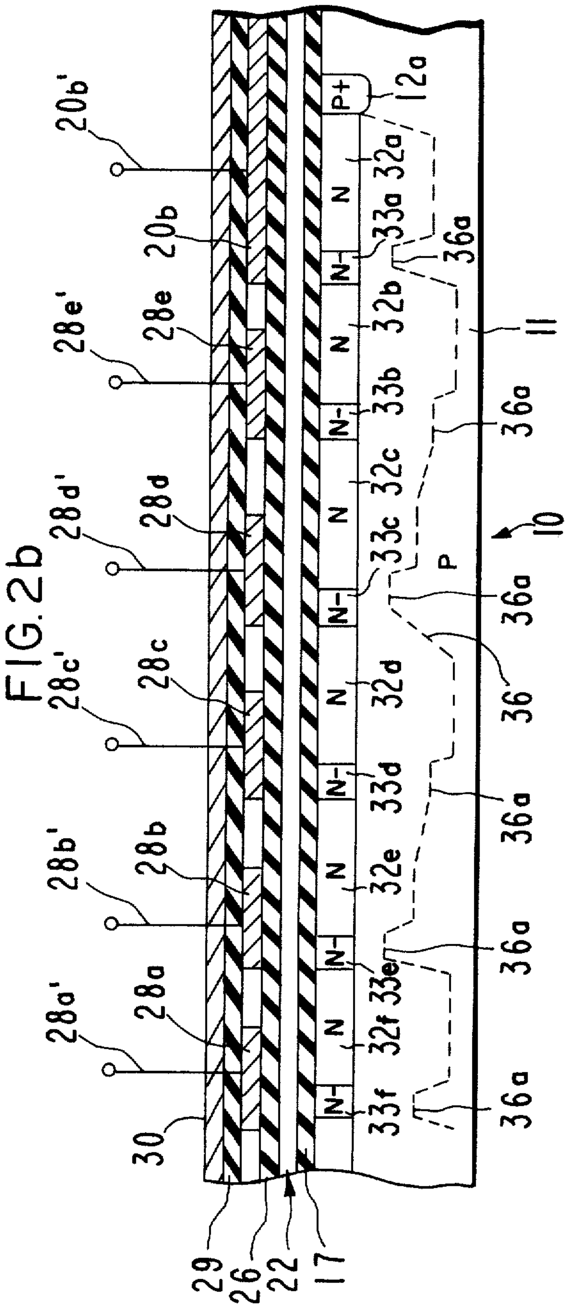
FIG. 2*b* is an elevational cross-section of the array taken along a single shift register.

FIG. 2*b* shows a cross-section along the parallel disposed shift register 6*a*, as shown in plan view in FIG. 1. Substrate 11, insulation 17, 26 and 29, channel stop 12*a*, and conductors 28*a* through 28*e* all correspond to the identical components shown in FIG. 2*a*. Conductor 20*b* is placed over insulation 17 on the right-hand portion of substrate 11. Conductor 20*b*, like conductor 20*a* in FIG. 2*a*, comprises a portion of the output shift register 7 employed for transferring the accumulated charges to external circuitry (not shown). A potential is applied to conductor 20*b* via lead 20*b'*. Insulation 26 and 29, and opaque shield 30, extend over the entire shift register 6*a* and the output shift register 7.

A buried channel 32 is formed within substrate 11 by ion implantation techniques as described above. Channel 32 is divided into regions 32*a* through 32*f* by forming regions 33*a* through 33*f*. The left edges of regions 33*a* through 33*f* are aligned with the left edge of each of conductors 20*b* and 28*a* through 28*e*. The ion concentration within regions 33*a* through 33*f* is of a lower donor density per unit area than that used in channel 32. The sequence of *n* type regions 32*a* through 32*f* and 33*a* through 33*f* comprise a buried channel shift register. Regions 32*a* through 32*f* are not required for operation, but merely serve to improve efficiency of operation. Regions 33*a* through 33*f* are required for operation of the disclosed structure to ensure uni-directional charge flow in two-phase operation.

In operation, the electron potential along the shift register 6*a* is shown as a dashed line 36 in FIG. 2*b* and the potential is modified by the presence of barriers 33*a* through 33*f*. That is, portions 36*a* of dashed line 36 are raised by the potential of the regions 33*a* through 33*f*. The charges are moved along the shift register (to the right in FIG. 2*b*) by applying two out-of-phase clock signals to the leads 28*a'* through 28*e'*. A first clock signal (or first phase) is applied to the leads 28*a'*, 28*c'* and 28*e'*; and, a second clock signal (or second phase) is applied to the leads 28*b'* and 28*d'*.

Referring again to FIG. 1, channel stop region 12*a* outlines the region of activity on substrate 11. Conductors 20*a* through 20*f* comprise a portion of the conductors of the output shift register 7, which is employed for transferring the charges received from the parallel disposed shift registers 6*a*, 6*b*, 6*c* . . . to charge detection circuitry (not shown). Conductors 28*a* through 28*e*, which are disposed perpendicular to conductors 20*a* through 20*f*, comprise a portion of the conductors of the parallel disposed shift registers 6*a*, 6*b*, 6*c* . . . employed for transferring the charges accumulated in the light sensing elements to the output shift register 7.

The opaque shield 30, having openings 38 formed in alignment with the columns 5*a*, 5*b*, 5*c* . . . , is shown in FIG. 1 as an outline only and partially cut away. Those portions of the structure of the device 10 lying beneath the shield 30 are not illustrated with conventional dashed lines for purposes of clarity in the drawing. Openings 38 are formed in the shield 30 to allow light to impinge only upon the areas of the substrate comprising the columns of light sensing elements.

For example, electrons 24 are generated within the light sensing elements of column 5*a* in response to incident light impinging thereon. The electrons 24 are transferred to the adjacent parallel disposed shift registers 6*a* by changing the potentials applied to the conductor 22*a*. The electrons are transferred along the shift register 6*a* (in an upward direction as shown in FIG. 1) by applying two-out-of-phase clock signals to conductors 28*a* through 28*e* as described above.

Referring now to FIG. 2*c*, two light sensing elements within column 5*a* are shown in plan view without the overlying conductors. Channel stop regions 12*a*, 12*c*, 12*d* and 12*e*, which are illustrated in FIG. 2*c* with a first cross-hatching, partially define light sensing areas 44 and 45 in the substrate 11. Barriers 33*d* and 33*e*, which have an L planar shape and are illustrated in FIG. 2*c* by a second cross-hatching, define the boundary between the areas 44 and 45 and the adjacent areas of the shift register 6*a*. The first and second cross-hatching shown in FIG. 2*c* is also shown in corresponding exposed regions in FIG. 1. When buried channel 16 is employed, channel regions 16*b* and 16*c* are formed within areas 44 and 45, respectively.

Electrons 24 accumulate within the areas 44 and 45, and are restricted in their direction of travel (as indicated by the arrows in FIGS. 1 and 2*c*) to adjacent regions of the shift register 6*a* only. That is, the electrons cannot travel through the channel stop regions, but they can travel through the implanted barriers 33*d* and 33*e* when the voltage applied on the conductor 22*a* (FIG. 2*a*) is decreased relative to the voltage applied on conductors 28*c* and 28*b*, respectively. If light were to impinge directly upon channel stop region 12*d*, then electrons will accumulate proportionately within the adjacent areas 44 and 45. The remaining light sensing elements within the device 10 are formed as described above, and operate in the same manner.

Figure 3A:
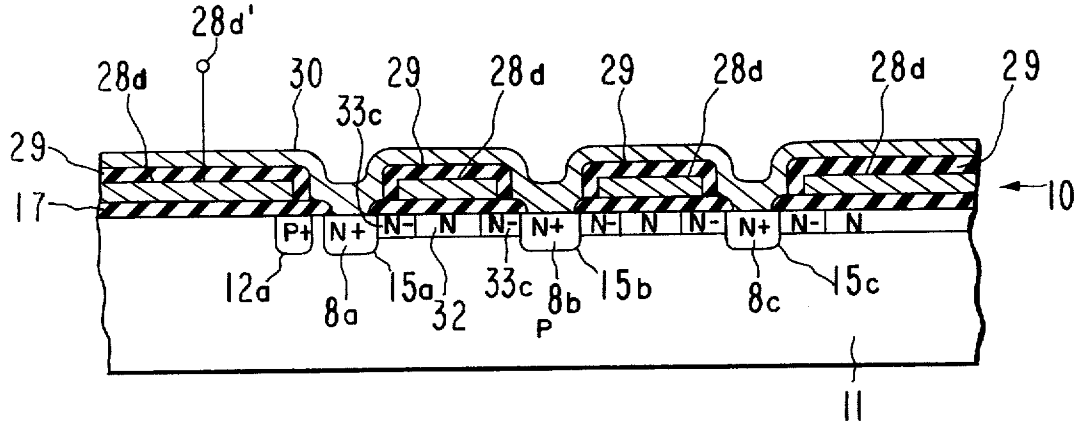
FIG. 3*a* is an elevational cross-section of the array taken perpendicular to the colums of light sensing elements within the array, wherein cross-sections of the charge sink regions are shown.

Referring now to FIG. 3*a*, a cross-section taken perpendicular to the columns of light sensing elements is shown. Channel stop region 12*a* is formed in substrate 11 with P+ impurity concentrations as described above. Also, charge sink regions 8*a*, 8*b* and 8*c* are formed in substrate 11 with N+ impurity concentrations as described above, thereby forming PN junctions 15*a*, 15*b* and 15*c*, respectively. Insulation layer 17 is formed over substrate 11, except in those areas above regions 8*a*, 8*b* and 8*c*. Conductor 28*d* is formed over insulation layer 17, and comprises one continuous conductor, even though in FIG. 3*a* this conductor appears broken into several separate conductors as a result of the section line 3*a* (FIG. 1).

Insulation layer 29 is formed over conductor 28*d* except in those areas above regions 8*a*, 8*b* and 8*c*. Shield 30, with associated lead 30', is formed over insulation 29 and makes ohmic contact with regions 8*a*, 8*b* and 8*c*.

Buried n channel 32 is formed in substrate 11 between regions 8*a* and 8*b* in a manner as described above. Barrier 33*c* is formed in substrate 11 in a manner as described above on either side of channel 32. It is the function of barrier 33*c* to form walls of controlled height between the potential well and the charge sinking regions 8*a* and 8*b*. When the potential well in channel region 32 is saturated with electrons, any excess electrons entering this potential well are transferred to region 8*a* or 8*b*. Therefore, regions 8*a*, 8*b*, 8*c*. . . act to sink excess electrons, and thereby prevent "blooming" in portions of the substrate beyond the particular saturated column. This operation is described in greater detail in the above-cited patent application Ser. No. 362,131. However, the operation of the structure disclosed herein differs from that described in the above-cited patent application Ser. No. 362,131 in that additional transfer gates are not required for the operation of the charge sink regions 8*a*, 8*b*, 8*c*, . . . . The potential within barrier 33*c* is fixed at a level above that within channel region 32 but equal to or beneath the maximum level to which that potential and the potential within channel region 32 can be raised by lowering the voltage on conductor 28*d*. Conductor 28*d* extends over barrier 33*c* to ensure that the potential of the semiconductor material beneath this barrier is always a substantially fixed amount above the potential in the semiconductor material beneath that portion of conductor 28*d* and within channel 32.

The particular structure as shown in FIG. 3*a* is a passive structure as described in the above-cited patent application Ser. No. 362,131. That is, the structure is passive as opposed to an active structure which employs a separate conductor over the substrate 11 for controlling the height of the wall between the shift register and the charge sink region 8*a*. It was further stated in the above-cited application that a passive structure lacks versatility in that the height of the wall cannot be separately controlled. However, since the invention disclosed herein cannot prevent "blooming" within an individual column, but prevents blooming within a saturated column from affecting the output shift register 7; the lack of versatility by the use of a passive structure is not a problem of the disclosed device.

Figure 3B:
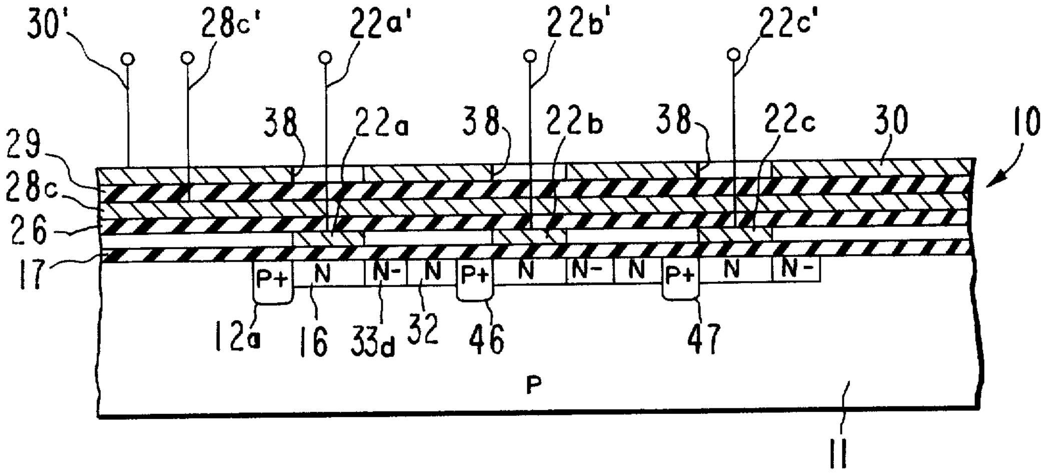
FIG. 3*b* is an elevational cross-section of the array taken perpendicular to the columns of light sensing elements within the array, wherein cross-sections of the light sensing elements are shown.

Referring now to FIG. 3*b*, a cross-section is taken perpendicular to the columns of light sensing elements, wherein individual light sensing elements are illustrated in greater detail. Channel stop region 12*a*, *n* channel regions 16 and 32, and barrier 33*d* are formed in the substrate 11 as described above. Channel stop regions 46 and 47, which are associated with columns 5*b* and 5*c*, are also formed within the substrate 11 as described above. Insulation layer 17 is formed over the surface of substrate 11, and transparent conductors 22*a*, 22*b* and 22*c* with associated leads 22*a*', 22*b*' and 22*c*', respectively, are formed from the layer 22 of polycrystalline silicon as described above. Insulation layer 26 is formed over the layer 22. Conductor 28*c*, with associated lead 28*c*', is formed over insulation layer 26 from an additional layer 28 of polycrystalline silicon. Insulation 29 is formed over layer 28, and shield 30 is formed over this layer of insulation.

In operation, electrons are accumulated within substrate 11 beneath conductor 22*a*. When the potentials applied to the conductors 22*a* and 28*c* are changed, in a conventional manner, the electrons beneath conductor 22*a* are shifted to the right and are retained within channel 32 (which is within the shift register). The electrons are subsequently transferred by the parallel disposed shift register to the output register by applying the two out-of-phase clock signals to conductors 28*a*, 28*b*, 28*c* . . . , as described above.

What is claim is:

1. A charge coupled area imaging device having anti-blooming control, which device comprises:
   a. a semiconductor substrate of a first conductivity type;
   b. a plurality of parallel columns of light sensing elements associated with first portions of said substrate;
   c. a first corresponding plurality of shift registers associated with second portions of said substrate, said shift regisiters being interdigitated between and parallel to said columns of light sensing elements and each shift register being arranged in a column;
   d. means for transferring charge packets accumulated in said light sensing elements to appropriate positions in said first corresponding plurality of shift registers;
   e. an output shift register disposed in a third portion of said substrate for receiving said charge packets from said firsst corresponding plurality of shift registers; and,
   f. a second corresponding plurality of charge sink means for receiving excess charge, each of said charge sink means being located only adjacent to one end of a corresponding column of said first corresponding plurality of shift registers and to a corresponding position of said output shift register, whereby spreading of excess charge into said output shift register is controlled.

2. A device as defined in claim 1 including means for shifting said charge packets along said parallel disposed shift registers.

3. A device as defined in claim 2 including means for shifting said charge packets along said output register.

4. A device as defined in claim 1, wherein said charge sink means comprises a region of conductivity type opposite from that of said substrate, and formed adjacent to the surface of said semiconductor substrate.

5. A device as defined in claim 1, wherein each of said light sensing elements comprise an area of said substrate bounded on three sides by a channel stop region, said channel stop region being of the same conductivity type as said substrate and containing a higher concentration of impurities than said substrate, on the fourth side thereof by an implanted barrier, said implanted barrier being of opposite conductivity type from said substrate, and on the top thereof by a transparent conductor separated from said substrate by a layer of insulation.

6. A device as defined in claim 5, wherein said means for transferring said charge packets to appropriate positions of said shift registers comprises said transparent conductor and said implanted barrier.

7. A device as defined in claim 5 wherein said transparent conductor comprises polycrystalline silicon.

8. A device as defined in claim 1, wherein said first corresponding plurality of shift registers comprise:

a. a plurality of parallel conductors formed over said substrate and separated from said substrate by insulation;

b. potential wells located in said substrate beneath each of said parallel conductors; and, c. a corresponding plurality of implanted barriers disposed at the surface of said substrate and in alignment with one edge of each of said parallel conductors for transferring said charge packets in one direction along said first corresponding plurality of shift registers in response to two clock phase signals applied to said conductors, wherein said implanted barriers comprise conductivity material opposite from said substrate.

9. A device as defined in claim 8 including another corresponding plurality of implanted barriers disposed between said charge sink means and said second portions of said substrate for maintaining the potentials in said barriers at levels above the potentials in said second portions of said substrate when a first of said clock phase signals is applied to one of said conductors, whereby excess charges in said first corresponding plurality of shift registers transfer to said charge sink means.

10. A method of operating a charge coupled area imaging device formed in a semiconductor substrate, which comprises:

a. accumulating packets of charge in a plurality of columns of light sensing elements in response to incident light;

b. transferring said packets of charge to a first corresponding plurality of shift registers adjacent to and interdigitated between each of said columns;

c. moving said packets of charge along said first corresponding plurality of shift registers to an output shift register;

d. allowing excess charges within said first corresponding plurality of shift registers to transfer to charge sink regions being located only adjacent to one end of a corresponding one of said first corresponding plurality of shift registers and to a corresponding position of said output shift register by applying a fixed potential to a portion of said substrate disposed between each of said first corresponding plurality of shift registers and said charge sink regions, thereby to control charge blooming from one of said first corresponding plurality of shift registers into said output shift register.

* * * * *